(No Model.)
S. H. COOK.
FENCE.
No. 535,531.
Patented Mar. 12, 1895.
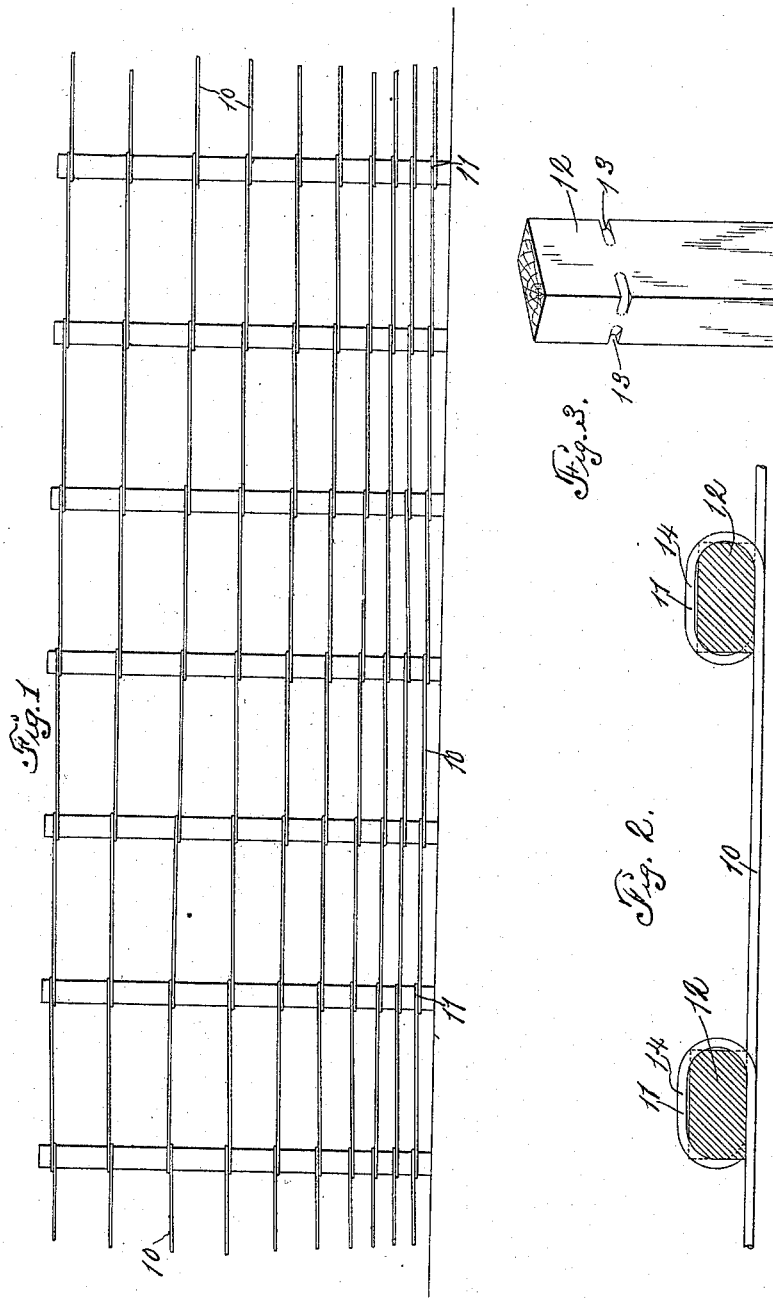
Witnesses:
G R Green.
J C Camp
Seymour H. Cook.
by J. C. Sweet
his Atty.

UNITED STATES PATENT OFFICE.

SEYMOUR H. COOK, OF LYONS, IOWA.

FENCE.

SPECIFICATION forming part of Letters Patent No. 535,531, dated March 12, 1895.

Application filed February 23, 1893. Serial No. 463,396. (No model.)

*To all whom it may concern:*

Be it known that I, SEYMOUR H. COOK, a citizen of the United States, residing at Lyons, in the county of Clinton and State of Iowa, have invented certain new and useful Improvements in Fences, of which the following is a specification.

The object of my invention is to provide a wire fence employing stays between the posts, which fence is so constructed as to prevent the passage of swine or other small animals through or beneath the lower portion thereof, and to prevent the passage of sheep, cattle or animals of an analogous size through the middle portion thereof, and to prevent horses or other large animals from leaping over, upon or breaking down the same and thereby escaping.

A further object of my invention is to provide a fence constructed of smooth wire, posts and stays in such a manner as to exclude or include all manner of domestic swine, cattle, horses, sheep, goats and animals of an analogous nature, and which fence will yield slightly to the forcible impact of a moving body without injury to the body impacting therewith, and also expand and contract under the variety of atmospheric conditions without injuring the utility thereof.

My invention consists in the arrangement and combination of smooth wires separated by differential degrees of distance and adapted to be secured upon posts, which wires are each provided with a series of loops and stays positioned within said loops transversely of the series of wires, each stay being provided with a series of notches in the corners thereof adapted to admit and retain the said loop in the said wires.

My invention consists further in the details of construction, arrangement and combination of parts, hereinafter set forth, pointed out in my claim, and illustrated by the accompanying drawings, in which—

Figure 1 is a side view of a section of fence adapted to be attached to posts. Fig. 2 is an enlarged transverse sectional view of the two stays, showing the manner of connecting the stays and wires. Fig. 3 is an enlarged perspective view of one of the stays.

In the construction of the fence as shown, the numerals 10 designate smooth wires, each of which is provided at approximately uniform distances of separation with coils or loops 11, formed in the said wires without knotting, which coils or loops are of uniform size and shape. It will be observed that the distance between the several wires varies greatly, and is preferably approximately as follows: Those wires going to make up the lower portion of the fence are positioned closely to each other in order that small animals may not be able to effect a passage between them, those wires forming the middle portion of the fence being separated a greater distance, the spaces increasing in width as the top of the fence is approached, except the upper space which is again narrowed in order that a horse or analogous animal will be prevented from passing its head through the space and thus obtaining a leverage by which to break down the fence.

The coils or loops 11 in the several wires are arranged in vertical rows in alignment with each other to permit of the insertion of the stays 12, which stays are preferably quadrilateral in form and are provided at the corners thereof with the transverse grooves 13, adapted to admit and retain the other loop.

It will be observed that the grooves provided for receiving one coil of the wire are not all in the same horizontal plane but are spirally arranged on the stays and the coil in the wire is also spiral and corresponds therewith.

It will be observed that the loops 11 are circular in form and pass about and inclose the angular stays. The portions of said loops designated as 14 do not impinge against the said stays but pass around the same at a distance therefrom, thus providing for expansion and contraction of the wires under changes of temperature and atmospheric conditions without affecting the tension of the fence proper, the expansion and contraction proper affecting only those portions of the loops designated as 14. By reason of this relative construction of the loops and stays should the fence be subjected to a sudden shock such as that of an animal running against the same the portion 14 of the loops will be drawn more closely to the stays, thus yielding to the forcible impact and preventing breakage of the fence. Immediately upon the release of the pressure against the fence the portions 14 of the loops will regain their normal position by reason of their resiliency and maintain the normal tension of the wires.

It will be observed that the stays are employed principally to prevent the wires being separated an abnormal distance, without which separation it is designed that the wires shall be so closely positioned as to prevent the passage through the fence of animals which it is desired to exclude or confine, the grooves in said wires retaining the wires at uniformly distant points, which points are located sufficiently near to each other as to render it impossible for dumb animals to widen the spaces. It will be further observed that the employment of the stays provide objects of greater visibilty than the smooth wires, which may be readily discerned by the animal, even when running, thus avoiding the accidents so often occurring during panics or stampedes of confined stock running upon the wires unintentionally and destroying the fence. It will thus be seen that I have produced and herein described a fence composed mainly of wires, and possessing a maximum degree of strength, flexibilty, contractibility, expansibility and utility, with a minimum degree of expense of manufacture and setting up.

It will be observed also that the fence herein described is less subject to the influence of winds and storms than an ordinary picket and wire fence, possessing all the points of such a fence, and has at the same time a greater degree of valuable utility in the points heretofore mentioned, and further in preventing the banking and drifting of snow when used in cold climates.

It is intended to construct this fence by means of a machine invented by me for this purpose, in the operation of which machine the wires will be coiled about the stays mechanically, the fence being completed in sections and formed into rolls for convenience in transportation. It is not desired in this patent to claim or describe the machine, nor to claim the method of combining the wires and stays, but simply to claim the finished product, comprising certain elements, constructed and combined in a certain manner.

I am aware that fences have heretofore been constructed of closely approximated pickets joined in a sheet by two wires coiled about said pickets, but such construction requires the employment of many more pickets than is required in my construction, and at the same time, when in use, said fence is so compact that snow may drift leeward thereof and greatly obstruct travel adjacent thereto.

I am also aware that fences have been constructed of pickets secured to a plurality of wires by means of staples, and also by twisting double wires about said pickets, but in each instance the pickets are positioned within two or four inches of each other and the objections noted in the preceding paragraph would be applicable thereto. It is not desired therefore to claim such construction.

Having thus described my invention, what I claim as new therein, and desire to secure by Letters Patent of the United States therefor, is—

As a new article of manufacture, a fence comprising a series of wires separated by varying spaces, the narrower spaces being at the bottom of the fence, a series of aligning circular loops formed in said wires, at great distances of separation, which distances of separation exceed one linear foot, and a series of rectangular bars mounted in said series of aligning circular loops, which bars are each provided with corner notches arranged in series and corresponding in distances of separation with the said wires, the said circular loops engaging said bars at the corners thereof within said notches, as shown and described.

In testimony whereof I have hereunto affixed my signature in the presence of two witnesses.

SEYMOUR H. COOK.

In presence of—
C. R. LAMB,
CHAS. F. BELL.